(12) United States Patent
Akulavenkatavara et al.

(10) Patent No.: US 7,845,006 B2
(45) Date of Patent: Nov. 30, 2010

(54) MITIGATING MALICIOUS EXPLOITATION OF A VULNERABILITY IN A SOFTWARE APPLICATION BY SELECTIVELY TRAPPING EXECUTION ALONG A CODE PATH

(75) Inventors: Prasadarao Akulavenkatavara, Portland, OR (US); Janice M. Girouard, Austin, TX (US); Emily J. Ratliff, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 982 days.

(21) Appl. No.: 11/626,089

(22) Filed: Jan. 23, 2007

(65) Prior Publication Data

US 2008/0178287 A1    Jul. 24, 2008

(51) Int. Cl.
*G06F 11/30* (2006.01)
*G06F 12/14* (2006.01)
*G08B 23/00* (2006.01)
*G06F 13/00* (2006.01)

(52) U.S. Cl. .............. 726/22; 726/23; 726/25; 710/260; 710/261; 710/266

(58) Field of Classification Search .......... 726/22–23, 726/25; 710/260–261, 266
See application file for complete search history.

(56) References Cited

U.S. PATENT DOCUMENTS

2006/0294592 A1* 12/2006 Polyakov et al. .............. 726/24

OTHER PUBLICATIONS

Stallman et al. "Debugging with GDB: The GNU Source-Level Debugger, Seventh Edition, for GDB version 4.17" http://www.ofb.net/gnu/gdb/gdb_toc.html Feb. 1999.*

* cited by examiner

*Primary Examiner*—Michael J Simitoski
(74) *Attorney, Agent, or Firm*—Dillon & Yudell LLP

(57) ABSTRACT

A method of reducing the window of malicious exploitation between vulnerability publication and the installation of a software patch. One or more probe points are inserted into a code path in an application (or operating system if applicable) that contains one or more vulnerabilities (or coding errors). The probe points mark locations of the security vulnerabilities utilizing software interrupts to enable the original code base of the code path to remain unmodified. A probe handler utility subsequently monitors the execution of the code path and generates an alert if the execution reaches a probe point in the code path, thus indicating whether the application exhibits a particular vulnerability. The probe handler selectively performs one of multiple customizable corrective actions, thereby securing the application until an applicable software patch can be installed.

20 Claims, 3 Drawing Sheets

MITIGATING MALICIOUS EXPLOITATION OF A VULNERABILITY IN A SOFTWARE APPLICATION BY SELECTIVELY TRAPPING EXECUTION ALONG A CODE PATH

BACKGROUND OF THE INVENTION

1. Technical Field

The present invention relates in general to data processing systems and in particular to an improved method and system for protecting data processing systems from malicious attacks.

2. Description of the Related Art

Frequently, after the release of conventional computer software, the software publisher becomes aware of vulnerabilities in the software that may be exploited by hackers. These vulnerabilities are especially important in certain types of software, such as operating systems, Internet browsers, firewalls, and antivirus software. Typically, once the software publisher becomes aware of a vulnerability (or coding error), the software publisher makes an announcement (also referred to as a "vulnerability publication") and later releases a software patch to address the vulnerability.

The amount of time between vulnerability publication and malicious exploitation of the announced vulnerability is decreasing dramatically. For instance, hackers have utilized the Internet to exploit vulnerabilities within twenty-four hours of a software publisher's announcement of a particular vulnerability. Since system administrators need time to test the software patch and then apply the patch to affected computer systems, the decreasing hacker response times to vulnerability announcements widen the effective time window of malicious exploitation, regardless of when the announcement occurs within the software patch cycle (e.g., concurrently with software patch release, concurrently with vulnerability publication, etc.).

System administrators often prefer to reduce the scope and/or postpone the installation of software patches because of the risk of system failure when updating a currently stable system with a newly-released software patch. The system administrator is thus trapped in an untenable situation when a vulnerability (or coding error) is announced before a software patch is available, or if more testing is required before an available software patch can be applied. Furthermore, system administrators may want to forgo applying a particular software patch altogether if the corresponding vulnerability is not currently exhibited on a computer system. For example, the system administrator may not want to apply a software patch to a critical database if the installation requires shutting down and restarting the database (i.e., temporarily rendering the database inaccessible), unless the system administrator is aware that their system is exhibiting the vulnerability that would be solved by the software patch.

Consequently, an improved method and system for reducing the window of malicious exploitation between vulnerability publication and the installation of a software patch are needed.

SUMMARY OF THE INVENTION

Disclosed are a method, system, and computer program product for reducing the window of malicious exploitation between vulnerability publication and the installation of a software patch. Probe points are variables implemented by software interrupts that identify particular locations within a code path in kernel space and/or user space without altering the binary source code of the code path. Probe points are dynamically inserted in a code path of an application and/or operating system (OS) within user space and/or kernel space using software interrupts that enable the original code base of the code path to remain unmodified. The probe points mark the specific locations or portions of code that contain one or more security vulnerabilities (or coding errors) and enable a user to verify that the code path exhibits particular vulnerabilities when the code path is subsequently executed. During the execution of the application that contains the vulnerabilities, a probe handler utility generates an alert of the vulnerability when a probe point is encountered, and the probe handler utility performs one of several customizable corrective actions, thereby securing the application until an applicable software patch can be installed.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system, and computer program product for reducing the window of malicious exploitation between vulnerability publication and the installation of a software patch for an application.

Figure 1:
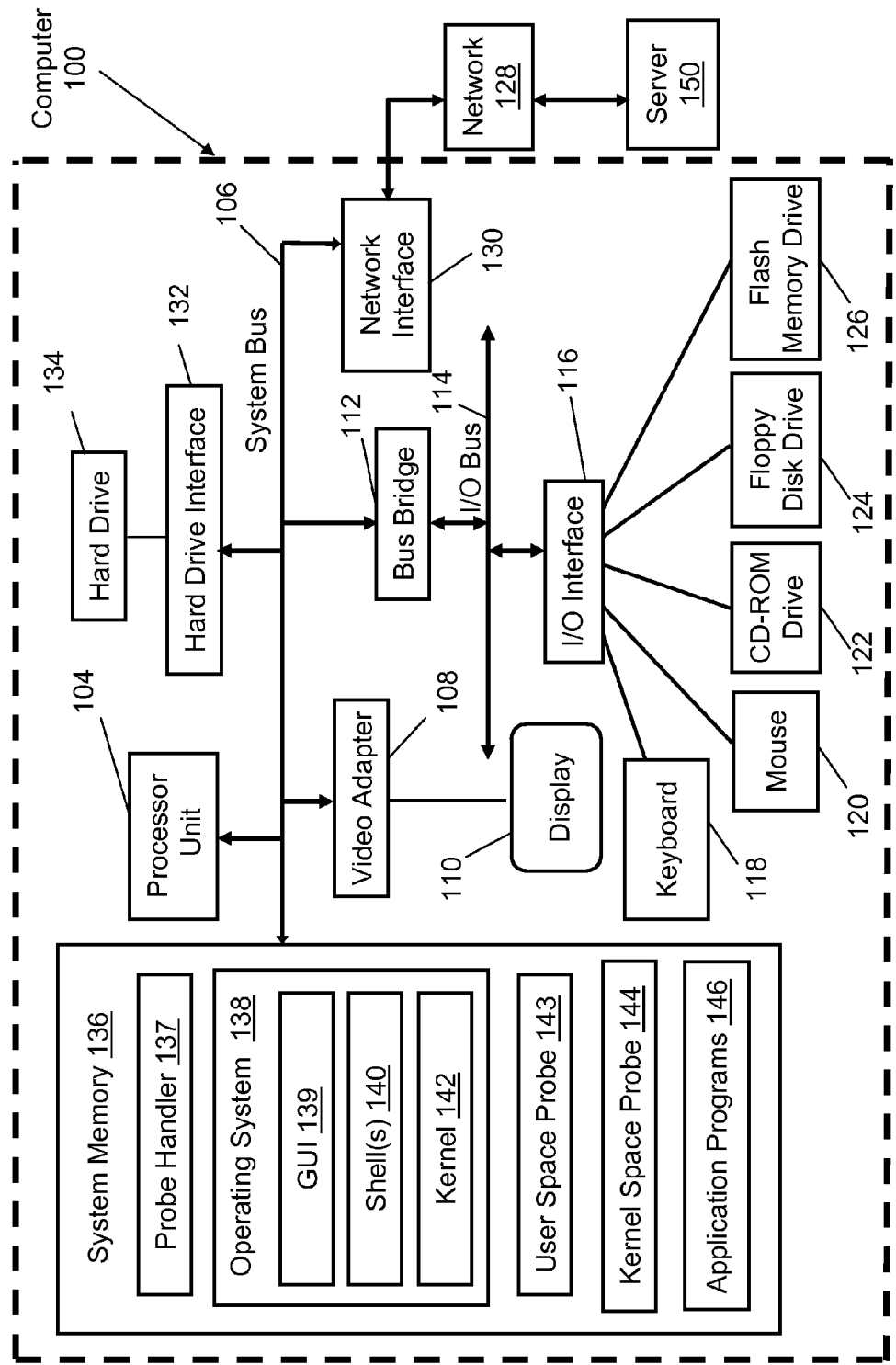
FIG. 1 depicts a high level block diagram of an exemplary data processing system, according to an embodiment of the present invention.

With reference now to FIG. 1, there is depicted a block diagram of an exemplary computer 100, with which the present invention may be utilized. Computer 100 includes processor unit 104 that is coupled to system bus 106. Video adapter 108, which drives/supports display 110, is also coupled to system bus 106. System bus 106 is coupled via bus bridge 112 to Input/Output (I/O) bus 114. I/O interface 116 is coupled to I/O bus 114. I/O interface 116 enables communication with various I/O devices, including keyboard 118, mouse 120, Compact Disk—Read Only Memory (CD-ROM) drive 122, floppy disk drive 124, and flash drive memory 126.

Computer 100 is able to communicate with server 150 via network 128 using network interface 130, which is coupled to system bus 106. Network 128 may be an external network such as the Internet, or an internal network such as an Ethernet or a Virtual Private Network (VPN).

Hard drive interface 132 is also coupled to system bus 106. Hard drive interface 132 interfaces with hard drive 134. System memory 136 is also coupled to system bus 106, and is defined as a lowest level of volatile memory in computer 100. This volatile memory may include additional higher levels of volatile memory (not shown), including, but not limited to, cache memory, registers, and buffers. Code that populates system memory 136 includes probe handler 137, operating system (OS) 138, user space probe 143, kernel space probe 144, and application programs 146. Probe handler 137 utilizes multiple probe points (e.g., user space probe 143 and kernel space probe 144) to perform the processes illustrated in FIGS. 2-3, which are discussed below. As utilized herein, probe points refer to variables implemented by software interrupts that identify particular locations (also referred to as software breakpoints) within a code path (e.g., code path 200 of FIG. 2 described below) in kernel space and/or user space without altering the binary source code of the code path. The probe points enable probe handler 137 (and a user) to indicate that the code path exhibits a particular security vulnerability, such as a "bug" or other undesirable coding problems/issues, when the code path is executed. The set of vulnerabilities are generally referred to herein as "coding errors" within the code path. According to the illustrative embodiment, when multiple security vulnerabilities arise, the location and/or type of each of the security vulnerabilities can be different. Consequently, the developer/distributor of the affected software announces the location and/or specific code that corresponds to each security vulnerability at the time when that security vulnerability is discovered.

In one embodiment, multiple probe handlers 137 may be developed and distributed by the manufacturers of each of application programs 146. Manufacturers of application programs 146 develop probe handlers 137 in response to the discovery of vulnerabilities (or coding errors). A user of computer 100 then installs probe handler 137, which dynamically insert probe points into one or more code paths (e.g., code path 200 of FIG. 2) of one of application programs 144. User space probe 143 and kernel space probe 144 are thus generic and do not require extensive testing each time a new software patch is released. In another embodiment, a single generic probe handler 137 may be developed and tested by a user of computer 100, and subsequently reused for all application programs 146.

In one embodiment, probe handler 137 utilizes a scripting language (e.g., "SystemTap" in UNIX®) to insert the one or more probe points (e.g., user space probe 143 or kernel space probe 144) into one of application programs 146 or kernel 142, respectively. During the execution of code path 200 (of FIG. 2), user space probe 143 (or kernel space probe 144 if applicable) performs one of several customizable (or corrective) actions if application program 146 (or OS 138 if applicable) attempts to execute a code block (e.g., code block 3 215 of FIG. 2) that contains a bug (220). These customizable actions, which are illustrated in FIG. 3 and described below, include, but are not limited to the following: (a) exiting the application (from among application programs 146 or kernel 142) that contains code path 200 (of FIG. 2); (b) performing a core dump and exiting (i.e., halting the execution of) the application; (c) exiting the application and initiating a process to apply the applicable software patch that fixes a bug (220); (d) logging an error message within system memory 136 (i.e., a notification in the "Syslog" file) for future use by the user and allowing execution of code path 200 (of FIG. 2) to continue; (e) logging an error message within system memory 136 and exiting the application; and (f) notifying kernel 142 in the case of serious data corruption to protect the enterprise from catastrophic damage.

OS 138 includes shell(s) 140 for providing transparent user access to resources such as application programs 146. Generally, shell 140 (as it is called in UNIX®) is a program that provides an interpreter and an interface between the user and the operating system. More specifically, shell 140 executes commands that are entered into a command line user interface. Thus, shell 140, also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., kernel 142) for processing. Note that while shell 140 is a text-based, line-oriented user interface, the present invention will support other user interface modes, such as graphical, voice, gestural, etc.

As depicted, OS 138 also includes graphical user interface 139 and kernel 142, which includes lower levels of functionality for OS 138. Kernel 142 provides essential services required by other parts of OS 138 and application programs 146. The services provided by kernel 142 include memory management, process and task management, disk management, and mouse and keyboard management.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIGS. 1 and 2xx for FIG. 2). The specific numerals assigned to the elements are provided solely to aid in the description and not meant to imply any limitations (structural or functional) on the invention.

Figure 2:
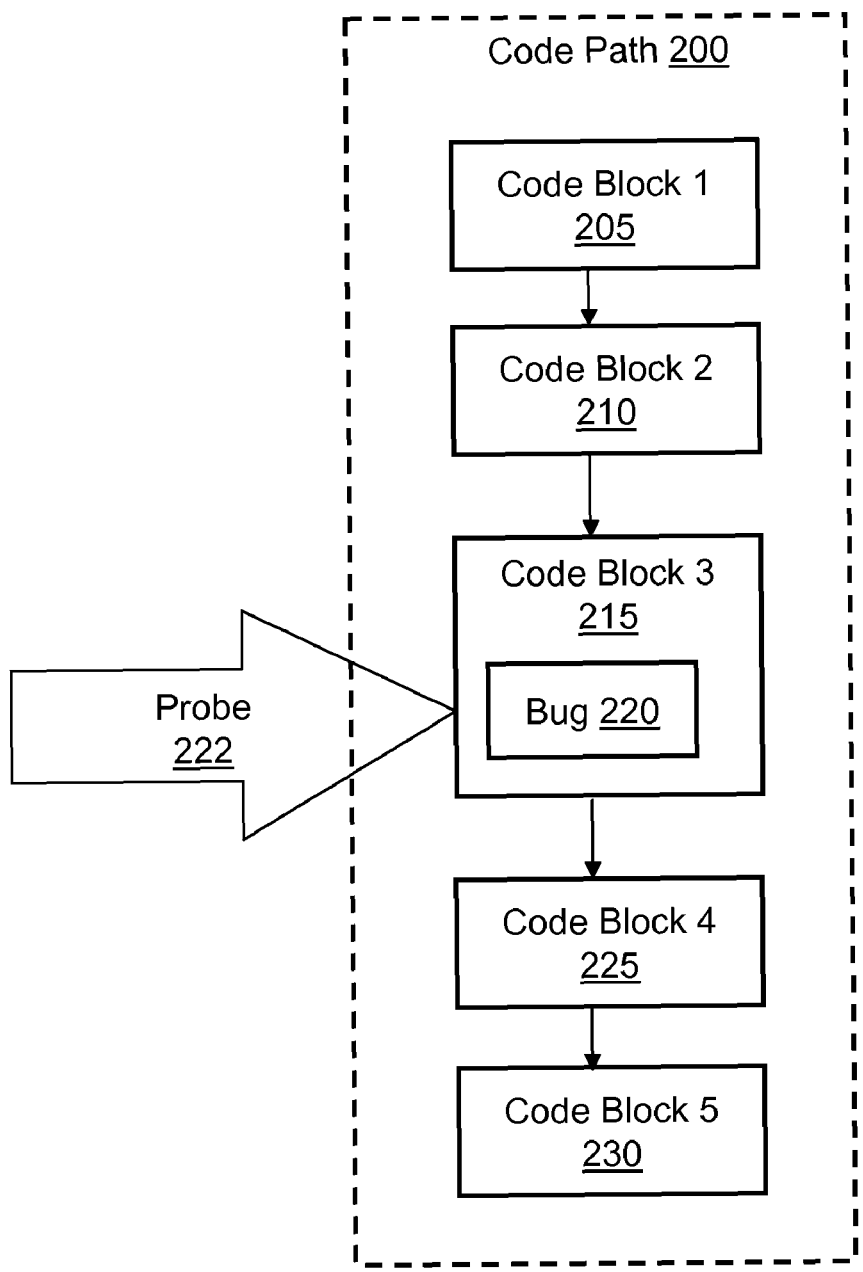
FIG. 2 illustrates a block diagram of an exemplary code path that includes a vulnerability and a probe point, according to an embodiment of the present invention.
Figure 3:
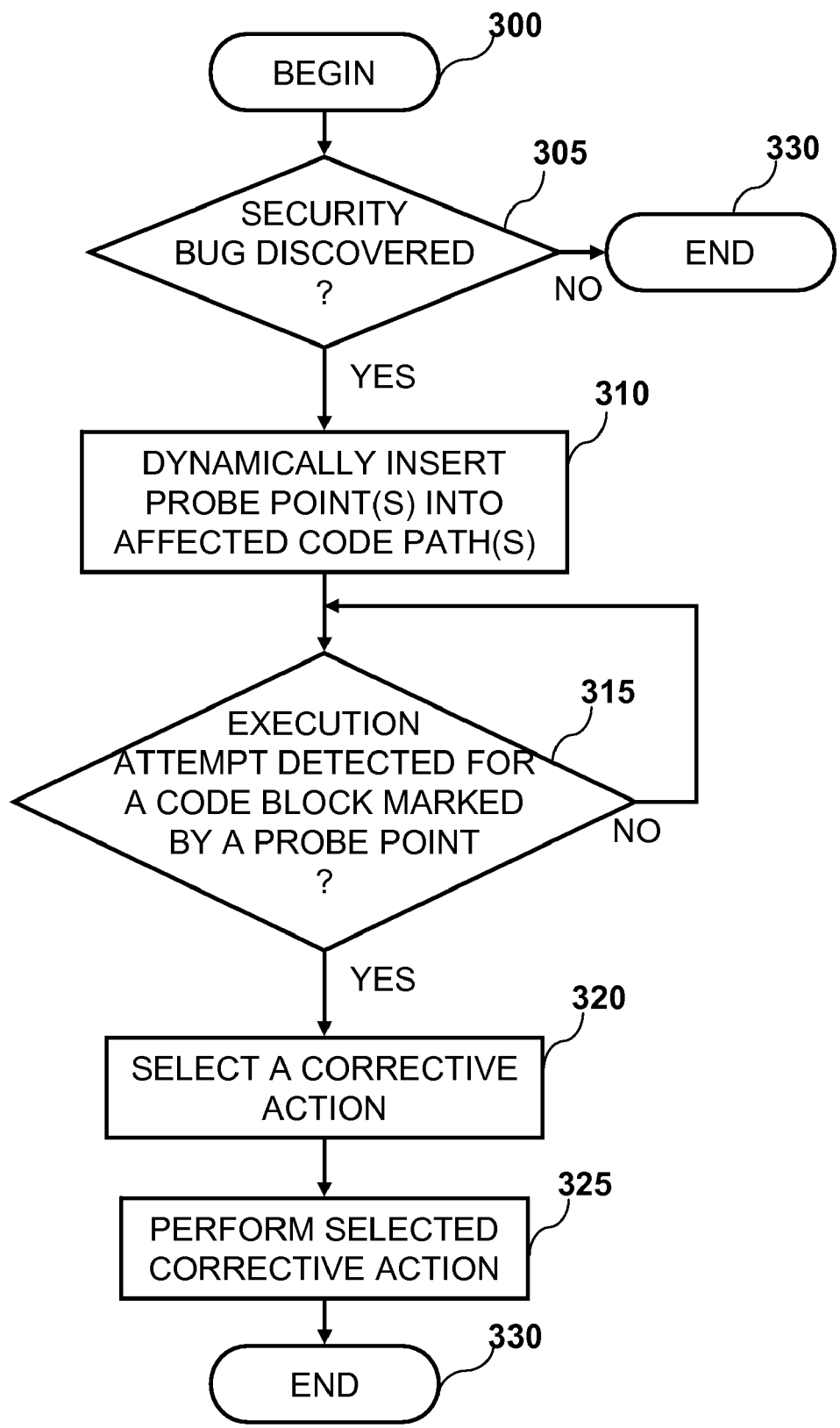
FIG. 3 is a high level logical flowchart of an exemplary method of utilizing probe points to reduce the window of malicious exploitation between vulnerability publication and the installation of a software patch for an application, according to one embodiment of the invention.

With reference now to FIG. 2, there is depicted a block diagram of exemplary code path 200 within one of application programs 146 (or OS 138 if applicable), according to an embodiment of the invention. As shown, code path 200 includes code block 1 205, code block 2 210, code block 3 215, code block 4 225, and code block 5 230. According to the illustrative embodiment, code block 3 215 includes bug 220 (again generally referred to as a "coding error"), and probe handler 137 positions probe 222 to point to code block 3 215 within code path 200. As utilized herein, a bug refers to a defect in a block of code that causes a malfunction during the execution of code path 200 and/or causes code path 200 to be vulnerable to a computer hacker.

The illustrative embodiment shows probe 222 pointing to code block 3 215 in code path 200 of application program (146), and thus probe 222 is stored within system memory 136 (from FIG. 1) as user space probe 143 (FIG. 1). In another embodiment, code path 200 may be located within kernel space, and thus probe 222 would be kernel space probe 143 (FIG. 1), which would point to the portion of code path 200 (e.g., code block 3 215) that contains bug 220. The number of code blocks within code path 200 may vary, and the five blocks are provided solely for illustration. Bug 220 may also be in a code block other than code block 3 215. Similarly, multiple code blocks within code path 200 may contain one or more bugs 220, and each bug would be identified by a different probe 222. Probe points may mark a file, function entry point, function exit point, and/or exact execution point (i.e., file and line number) within code path 200.

Turning now to FIG. 3, there is illustrated a high level logical flowchart of an exemplary method of utilizing probe points to reduce the window of malicious exploitation of an application between vulnerability publication and the installation of a software patch, according to one embodiment of the invention. The process begins at block 300 in response to the execution of code path 200 (from FIG. 2). A determination is made at block 305 whether a known security vulnerability or coding error (e.g., bug 220 of FIG. 2) exists within code path 200. If a bug (220) is not included in code path 200 that is currently being executed, the process terminates at block 330. If a bug (220) is included in code path 200 (FIG. 2), probe handler 137 utilizes a software interrupt to dynamically insert user space probe 143 (or kernel space probe 144 if applicable) into the affected code path, thereby marking the location of a bug (220) without altering the binary source code of the affected code path, as depicted in block 310. According to the illustrative embodiment, probe 222 marks code block 3 215 (FIG. 2), which contains a bug (220).

At block 315, a determination is made by probe handler 137 whether OS 138 (of FIG. 1) is attempting to execute the portion of code path 200 that contains bug 220 (e.g., code block 3 215 in FIG. 2). If OS 138 (FIG. 1) is not attempting to execute code block 3 215 (of FIG. 2), the process returns to block 315. If OS 138 (FIG. 1) attempts to execute code block 3 215 (FIG. 2), probe handler 137 (FIG. 1) selects a corrective action, based on pre-programmed information, which best correlates to the type of application (146), type of probe point encountered, and/or type of bug (220), as shown in block 320. At block 325, probe handler 137 (FIG. 1) performs the selected corrective action, and the process terminates at block 330.

In an alternate embodiment, probe handler 137 (FIG. 1) generates a prompt on GUI 139 (FIG. 1) requesting that a user of computer 100 (FIG. 1) select one of several possible corrective actions that correspond to a bug (220).

According to the illustrative embodiment, the possible corrective actions include, but are not limited to: (a) exiting the application (from among application programs 146 or kernel 142) that contains code path 200; (b) performing a core dump and exiting (i.e., halting the execution of) the application (or kernel 142); (c) exiting the application and initiating a process to apply the applicable software patch that fixes bug 220; (d) logging an error message within system memory 136 (i.e., a notification in the "Syslog" file) for future use by the user and allowing execution of code path 200 to continue; (e) logging an error message within system memory 136 and exiting the application; and (f) notifying kernel 142 in the case of serious data corruption to protect the enterprise from catastrophic damage.

In one embodiment, the error message (or notification message) generated contains details about the detected vulnerability, including, but not limited to, the code path of the vulnerability (i.e., a stack dump), identification information corresponding to the user who initiated the code path (e.g., process and group identification), and the network Internet Protocol (IP) address of the origin of the initiation command corresponding to the vulnerability.

The present invention thus enables probe points to dynamically mark the specific locations or portions of code in an application within user space and/or kernel space that contains one or more security vulnerabilities (or coding errors). During the subsequent execution of the application that contains the vulnerabilities, probe handler 137 generates an alert when a probe point is encountered and performs one of several customizable corrective actions, thereby securing the application until an applicable software patch is installed.

It is understood that the use herein of specific names are for example only and not meant to imply any limitations on the invention. The invention may thus be implemented with different nomenclature/terminology and associated functionality utilized to describe the above devices/utility, etc., without limitation.

While an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include non-transitory recordable type media such as thumb drives, floppy disks, hard drives, CD ROMs, DVDs, and transitory transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a computer system, a method comprising:
   automatically marking one or more locations at which one or more known security vulnerabilities exist within a code path of an application, by dynamically inserting via a software interrupt one or more probe points into the code path of the application;
   wherein said one or more probe points are software interrupts and said inserting of the one or more probe points comprises completing an insertion of the one or more probe points into an original compiled code base of the application, without modifying the original compiled code base;
   monitoring execution of said code path for detection of a probe point as the application is being executed;
   generating and outputting, at a time of encountering the probe point, an alert of a security vulnerability identified by the probe point that is detected during execution of the application; and
   selectively performing one of a plurality of corrective actions when said probe point is encountered within said code path, wherein said corrective actions are performed to secure the application until an applicable software patch is installed.

2. The method of claim 1, wherein said selectively performing comprises:
   in response to encountering the probe point in the code path, automatically generating and outputting, via a user interface, a prompt for selection of one of the plurality of corrective actions;
   receiving, in response to the prompt and via the user interface, a selection of a particular one of the plurality of corrective actions; and
   performing the particular one of the plurality of corrective actions.

3. The method of claim 1, wherein said selectively performing comprises:
   evaluating characteristics about one or more of a type of security vulnerability, a type of probe point encountered, and a type of application being executed;
   selecting a particular one of the plurality of corrective actions based on the characteristics evaluated; and
   performing the particular one of the plurality of corrective actions.

4. The method of claim 1, wherein said application is one of:
   a user-level application and the one or more probe points include a user space probe point; and
   an operating system (OS) application and the one or more probe points include a kernel space probe point.

5. The method of claim 1, wherein said plurality of corrective actions comprises:

preventing execution of said one or more code in said code path, which creates the security vulnerability;
outputting a notification message of the security vulnerability, wherein said notification message contains at least one of a stack dump, process identification, group identification, and a network Internet protocol (IP) address; and
exiting said application that contains said one or more security vulnerabilities.

6. A computer system comprising:
a processor;
a system memory coupled to said processor;
one or more probe points within said system memory;
means for automatically marking one or more locations at which one or more known security vulnerabilities exist within a code path of an application, by dynamically inserting via a software interrupt said one or more probe points into the code path of the application;
wherein said one or more probe points are software interrupts and said means for inserting of the one or more probe points comprises means for completing an insertion of the one or more probe points into an original compiled code base of the application, without modifying the original compiled code base;
means for monitoring execution of said code path for detection of a probe point as the application is being executed;
means for generating and outputting, at a time of encountering the probe point, an alert of a security vulnerability identified by the probe point that is detected during execution of the application; and
means for selectively performing one of a plurality of corrective actions when said execution reaches a probe point in said code path.

7. The computer system of claim 6, wherein said means for selectively performing comprises:
means for automatically generating and outputting, via a user interface, a prompt for selection of one of the plurality of corrective actions in response to encountering the probe point in the code path;
means for receiving, in response to the prompt and via the user interface, a selection of a particular one of the plurality of corrective actions; and
means for performing the particular one of the plurality of corrective actions.

8. The computer system of claim 6, wherein said means for selectively performing comprises:
means for evaluating characteristics about one or more of a type of security vulnerability, a type of probe point encountered, and a type of application being executed;
means for selecting a particular one of the plurality of corrective actions based on the characteristics evaluated; and
means for performing the particular one of the plurality of corrective actions.

9. The computer system of claim 6, wherein said application is one of:
a user-level application and the one or more probe points include a user space probe point; or an operating system (OS) application and the one or more probe points include a kernel space probe point.

10. The computer system of claim 6, wherein said plurality of corrective actions comprises:
means for preventing execution of said code in said code path, which creates the security vulnerability;
means for outputting a notification message of the security vulnerability, wherein said notification message contains at least one of a stack dump, process identification, group identification, and a network Internet protocol (IP) address; and
means for exiting said application that contains said one or more security vulnerabilities.

11. A computer program product comprising:
a non-transitory computer readable storage medium; and
program code on said computer readable storage medium that when executed provides the functions of:
automatically marking one or more locations at which one or more known security vulnerabilities exist within a code path of an application, by dynamically inserting via a software interrupt one or more probe points into the code path of the application, wherein said one or more probe points are software interrupts, and said inserting of the one or more probe points comprises completing an insertion of the one or more probe points into an original compiled code base of the application, without modifying the original compiled code base;
monitoring execution of said code path for detection of a probe point as the application is being executed;
generating and outputting, at a time of encountering the probe point, an alert of a security vulnerability identified by the probe point that is detected during execution of the application; and
selectively performing one of a plurality of corrective actions when said execution reaches a probe point in said code path.

12. The computer program product of claim 11, wherein said program code that provides said selectively performing comprises code for:
generating and outputting via a user interface a prompt for selection of one of the plurality of corrective actions, in response to encountering the probe point within the code path;
receiving, in response to the prompt and via the user interface, a selection of a particular one of the plurality of corrective actions; and
performing the particular one of the plurality of corrective actions.

13. The computer program product of claim 11, wherein said program code that provides said selectively performing comprises code for:
evaluating characteristics about one or more of a type of security vulnerability, a type of probe point encountered, and a type of application being executed;
selecting a particular one of the plurality of corrective actions based on the characteristics evaluated; and
performing the particular one of the plurality of corrective actions.

14. The computer program product of claim 11, wherein said application is one of:
a user-level application and the one or more probe points include a user space probe point; and
an operating system (OS) application and the one or more probe points include a kernel space probe point.

15. The computer program product of claim 11, wherein said plurality of corrective actions comprises:
preventing execution of said one or more code in said code path, which creates the security vulnerability;
outputting a notification message of the security vulnerability, wherein said notification message contains at least one of a stack dump, process identification, group identification, and a network Internet protocol (IP) address; and
exiting said application that contains said one or more security vulnerabilities.

16. In a data processing system, a method that provides dynamic reduction in vulnerabilities in an application, the method comprising:

detecting execution of a code path of the application;

determining whether a known security vulnerability or coding error exists within the code path; and when a known security vulnerability or coding error exists, automatically marking a location of the security vulnerability or coding error by dynamically inserting, via a software interrupt, one of a user space probe or a kernel space probe into an affected code path to mark a location of the security vulnerability or coding error;

wherein the automatically marking is performed without altering a binary source code of the affected code path; and wherein the automatically marking enables a probe handler to detect the probe point during subsequent execution of the application that contains the security vulnerability or coding error and the probe handler responds to encountering the probe point within the affected code path by automatically generating an alert and dynamically performing one of several customizable corrective actions to secure the application until an applicable software patch is installed and the probe point is removed.

17. The method of claim 16, further comprising:

determining if an operating system (OS) of the data processing system is attempting to execute code within the affected code path; and when the OS is attempting to execute code within the affected code path, dynamically selecting a corrective action, based on pre-programmed information, which best correlates to one or more of (a) a type of application being executed, (b) a type of probe point encountered, and a type of security vulnerability or coding error; and automatically performing the selected corrective action, wherein the corrective action is performed when the probe point is encountered and not after execution of the application is completed.

18. The method of claim 16, further comprising:

generating on a graphical user interface (GUI) a prompt containing an error notification message; and requesting within the GUI a selection of one of several possible corrective actions that correspond to the security vulnerability.

19. The method of claim 18, wherein the several possible corrective actions comprise:

(a) exiting the application that contains the code path; (b) performing a core dump and halting the execution of the application or kernel; (c) exiting the application and initiating a process to apply an applicable software patch that fixes the security vulnerability; (d) logging an error message within a system memory of the data processing system for future access and allowing execution of the code path to continue; (e) logging an error message within system memory and exiting the application; and (f) notifying the kernel if serious data corruption occurs to protect against catastrophic damage.

20. The method of claim 19, wherein the error notification message generated contains details about a detected vulnerability, including (a) the code path of the vulnerability, (b) process and group identification information corresponding to a user who initiated the code path, and (c) a network Internet Protocol (IP) address of an origin of an initiation command corresponding to the security vulnerability.

* * * * *